Patented Apr. 3, 1945

2,372,655

UNITED STATES PATENT OFFICE 2,372,655

DERIVATIVES OF THE 2-ALKYL-1,4-NAPHTHOQUINONE

Max Bockmühl, Frankfort-on-the-Main, Otto Schaumann and Erich Bartholomäus, Wiesbaden, and Heinrich Leditschke, Frankfort-on-the-Main, Germany, assignors to Winthrop Chemical Company, Inc., New York, N. Y., a corporation of New York No Drawing. Application November 27, 1940, Serial No. 367,428. In Germany November 30, 1939

4 Claims. (Cl. 260—482)

The present invention relates to derivatives of 2-alkyl-1,4-naphthoquinone.

As it is known the fundamental substance of vitamin K, i. e. 2-methyl-1,4-naphthoquinone, and the hydrogenation product thereof, the methylnaphthohydroquinone, as well as the analogues of the said products have a more or less pronounced vitamin K-action. Since these substances are insoluble in water or, in the form of their alkali salts, soluble in water but very unstable, they may be applied only perorally or in an oily solution. Consequently, there exists a demand for preparations which have the effect of vitamin K and which, also in the form of their aqueous solutions, are stable and may be administered parenterally.

Now, we have found that by introducing into methyl-naphthoquinone, methylnaphthohydroquinone and the analogues thereof chemical groups which impart to the compounds the property of dissolving in water, new compounds may be obtained which have the effect of vitamin K owned by the fundamental body. The new compounds may be obtained by various ways. For instance, the hydroquinones of this series may be transformed into the corresponding chloracetic acid esters and the latter may be caused to react with hexamethylenetetramine or trimethylamine with formation of the quaternary compounds.

With the same or a similar result 2-alkylnaphthohydroquinone may be caused to react with anhydrides or chlorides of polybasic acids such as succinic anhydride, phosphorus oxychloride or the like whereby ester-acids are obtained which in the form of their salts, for instance their alkali metal salts, such as their sodium or potassium salts as well as their ammonium salts are soluble in water. It is also possible to react 1.4-naphthoquinones with hydrazine compounds carrying groups which render the products soluble in water, for instance, with the chloromethylate of dimethylamino acetic acid hydrazide.

It is surprising that compounds of the type of methylnaphthoquinone may be converted into a water-soluble form without losing their vitamin K-properties.

The following examples illustrate the invention, the parts being by weight unless otherwise stated:

1. *1,4-bis-dimethylaminoacetoxy-2-methyl-naphthalene-bis-chloromethylate*

70 parts of 1,4-dihydroxy-2-methyl-naphthalene are heated in the oil bath for several hours at 120° C.–130° C. with 200 parts by volume of chloracetyl chloride. After cooling, the whole is poured on ice and the solid substance which has separated is filtered with suction. Thereupon, it is dissolved in ether, shaken out with bicarbonate solution and dried by means of calcium chloride. By evaporating the solution, the chloracetyl compound is obtained which, when dissolved and reprecipitated from a mixture of chloroform and gasoline, forms colorless needles melting at 113° C.

9.8 parts of the chloracetyl compound are dissolved in 60 parts by volume of ethyl acetate and 35 parts by volume of a solution of 15% strength of trimethylamine in benzene are added. Gradually crystals of the chloromethylate separate with a very good yield. When dissolved and reprecipitated from a mixture of absolute alcohol and ethylacetate, they form colorless needles which easily dissolve in water and decompose at 220° C.–221° C.

The product has the formula:

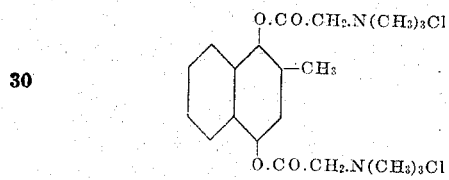

Instead of the chloracetyl chloride there may be used higher chlorinated acid chlorides, for instance, chloropropionylchloride. Furthermore, it is possible to use instead of the trimethylamine another tertiary amine, for instance, dimethylethylamine or triethylamine. In all cases homologues compounds are obtained which, owing to their larger molecule, have a somewhat smaller efficiency than the above described product.

2. *(2-methyl-1,4-naphthohydroquinone)-disuccinic acid*

17.4 parts of 1,4-dihydroxy-2-methylnaphthalene and 24 parts of succinic anhydride are dissolved in 110 parts by volume of acetone. While stirring, there are gradually added 100 parts by volume of a saturated sodium carbonate solution, the whole is acidified with dilute hydrochloric acid and precipitated with water. The crude product thus obtained with a good yield is dissolved and re-precipitated from a mixture of acetone and water and then forms colorless small crystals which melt at 198° C.–199° C. and are easily soluble in ammonia and lyes.

The product has the following formula:

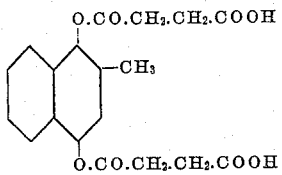

3. (2-methyl-1,4-naphthohydroquinone)-disuccinic acid 52.2 parts of 1,4-dihydroxy-2-methylnaphthalene and 80 parts of succinic anhydride are heated with 150 parts by volume of pyridine until solution takes place and the whole is allowed to cool. Thereupon, ice is added to the solution which is then acidified with dilute hydrochloric acid; thereby the ester-acid which has the above properties precipitates with a very good yield. The sodium salt of the acid is obtained by dissolving 22.5 parts of acid in 100 parts by volume of acetone and 20 parts by volume of water with addition of 120 parts by volume of N-caustic soda solution and by strongly concentrating the solution under reduced pressure. From this concentrated solution the salt is precipitated by means of absolute alcohol.

4. 2-methyl-1,4-naphthoquinone-4-succinylhydrazone

The solutions of 17.2 parts of 2-methyl-1,4-naphthoquinone in 100 parts by volume of glacial acetic acid and of 18 parts of the ammonium salt of the monohydrazide of succinic acid (cf. "Journal für praktische Chemie" No. 92, page 86) in 100 parts by volume of glacial acetic acid are mixed and the whole is allowed to stand for two days at room temperature. Very soon part of the product begins to crystallize out; it may be isolated by filtering with suction. The rest may be obtained by dilution with water or strong concentration of the mother lye and making it into a paste by means of water. The yield is nearly quantitative. The crude product may be purified by dissolving it in dilute ammonia and precipitating it with acetic acid. The product is difficultly soluble in the usual solvents and decomposes at 252° C.

The sodium salt of the product is obtained by addition of the calculated amount of N-caustic soda solution to an alcoholic suspension of the acid and evaporation of the solution. It crystallizes from alcohol of 50% strength in the form of tiny yellow needles which are easily soluble in water.

The product has the following formula:

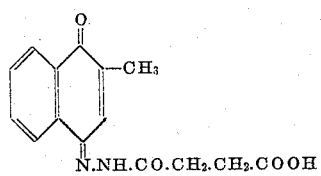

5. (2-methyl-1,4-naphthoquinone)-(N-dimethylaminoacetyl-hydrazone)-chloromethylate A mixture of 17.2 parts of 2-methyl-1,4-naphthoquinone, 10 parts by volume of glacial acetic acid, 17.5 parts of "Reagens T" according to Girard (cf. Helv. chim. Acta 19, page 1103) and 130 parts by volume of alcohol is heated for one hour in the steam bath whereby part of the reaction product precipitates already soon. The rest may be obtained on cooling or on concentrating the mother-lye under reduced pressure and making it into a paste by means of alcohol. The yield amounts to about 90% of the theoretical. After dissolution and re-precipitation from methanol the product forms small yellow needles which decompose at 259° C. and dissolve in water.

The product has the following formula:

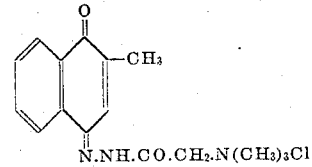

6. 2-methyl-1,4-naphthoquinone-4-phenylhydrazone-4'-carboxylic acid 8.6 parts of 2-methyl-1,4-naphthoquinone are dissolved in 50 parts by volume of hot glacial acetic acid and the whole is added to a hot solution of 9.2 parts of phenylhydrazine-4-carboxylic acid hydrochloride and 4.5 parts of sodium acetate in a mixture of 75 parts by volume of glacial acetic acid and 50 parts by volume of water. On cooling, the reaction product crystallizes with a good yield in the form of dark-red needles decomposing at 266° C.–267° C. By dissolution in the calculated amount of N-caustic soda solution and evaporation of this solution, the sodium salt of the acid is obtained which may be recrystallized from water.

The product has the following formula:

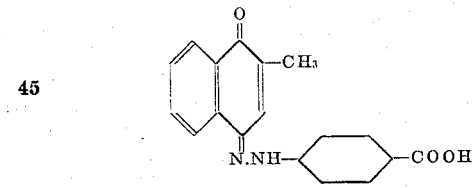

7. 2-methyl-1,4-naphthohydroquinone-diphosphoric acid

A solution of 31 parts of phosphorus oxychloride in 60 parts by volume of pyridine is gradually mixed, while cooling, with a solution of 17.4 parts of 2-methyl-1,4-naphthohydroquinone in 50 parts by volume of pyridine and the next day the whole is poured on ice. By cautious acidification with concentrated hydrochloric acid the ester-acid separates in the form of a yellow smeary matter. The solution standing above is poured off and the ester-acid is rinsed with water.

The product thus obtained is dissolved in ammonia and the solution is evaporated under reduced pressure after being treated with charcoal; the yellow ammonium salt remains as a solid mass. It is easily soluble in water.

The product has the following formula:

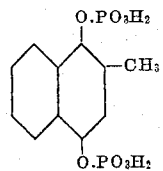

8. 2-methyl-1,4-naphthohydroquinone-disulfate of sodium 24 parts of chlorosulfonic acid are dissolved, while well cooling, in a mixture of 60 parts by volume of pyridine and 50 parts by volume of benzene; at 0° C.–5° C. a solution of 17.4 parts of 2-methyl-1,4-naphthohydroquinone in 50 parts by volume of pyridine is gradually added. The next day the whole is well shaken with 435 parts by volume of N-caustic soda solution and the mixture is evaporated under reduced pressure. The solid residue is treated with methanol, the inorganic salts remaining undissolved. The filtrate is either evaporated or precipitated by means of ether. The sodium salt thus obtained is dissolved and reprecipitated from dilute alcohol and forms feebly pink colored small crystals. The yield is nearly quantitative.

The product has the following formula:

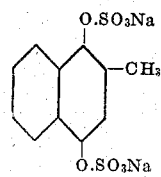

9. 1-hydroxy-2-methyl-4-dimethylaminoacetoxy-naphathalene-chloromethylate 12.5 parts of 1-hydroxy-2-methyl-4-chloracetoxy-naphthalene (obtained by the action of chloracetylchloride on 1,4-dihydroxy-2-methyl-naphthalene in toluene and melting at 123° C.–124° C.) are mixed with 100 parts by volume of benzene and 30 parts by volume of a trimethylamine solution of 15% strength. The chloracetyl compound dissolves quickly and the ammonium compound separates soon with a good yield. The next day it is filtered with suction and re-dissolved from water. It forms colorless small crystals which decompose at 226° C.–227° C.

The product has the following formula:

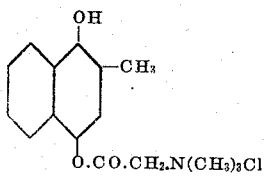

10. 2-methyl-1,4-naphthoquinone-bisulfite compound 17.2 parts of 2-methyl-1,4-naphthoquinone, 50 parts by volume of water, 10 parts by volume of methanol and 60 parts by volume of sodium bisulfite solution of 39% strength are together heated on the steam bath until all of the quinone has dissolved to a yellow solution. The solution is then evaporated under reduced pressure and the residue obtained is treated with alcohol, whereby the bisulfite compound dissolves, whereas unchanged sodium bisulfite remains undissolved and is separated. The alcoholic solution is evaporated, the distillation residue is taken up with a small quantity of methanol and precipitated with dry ether. Thereby a yellow, tough smeary substance is obtained which, on drying, swells up to form a solid substance. By trituration it is transformed into a voluminous, yellow, very hygroscopic powder. The yield is nearly quantitative.

The product is stable in aqueous solution even in the presence of an acid; it is decomposed by lyes.

The product has the following formula:

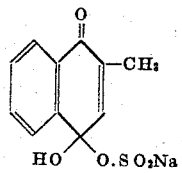

We claim:

1. The compound of the following formula:

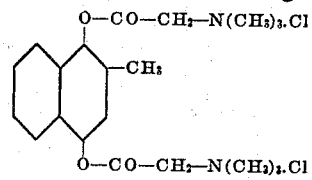

said compound being colorless needles decomposing at 220–221° C. and showing in aqueous solution the physiological effect of vitamin K.

2. A water-soluble quaternary ammonium compound having vitamin K activity, said compound being an ester of 1,4-dihydroxy-2-methyl-naphthohydroquinone with a lower aliphatic monocarboxylic acid, said acid having a quaternary ammonium salt grouping attached to the hydrocarbon skeleton thereof.

3. A compound having vitamin K activity and having the formula:

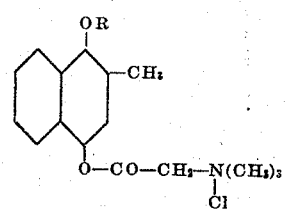

R being a member of the class consisting of hydrogen and

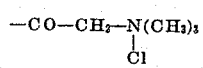

4. The compound having the formula

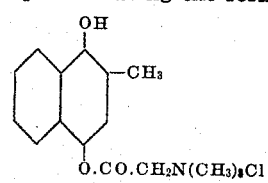

MAX BOCKMÜHL.
OTTO SCHAUMANN.
ERICH BARTHOLOMÄUS.
HEINRICH LEDITSCHKE.